Dec. 18, 1951   E. TORGESON   2,578,762
ANIMAL TRAP
Filed Oct. 17, 1946   3 Sheets-Sheet 1
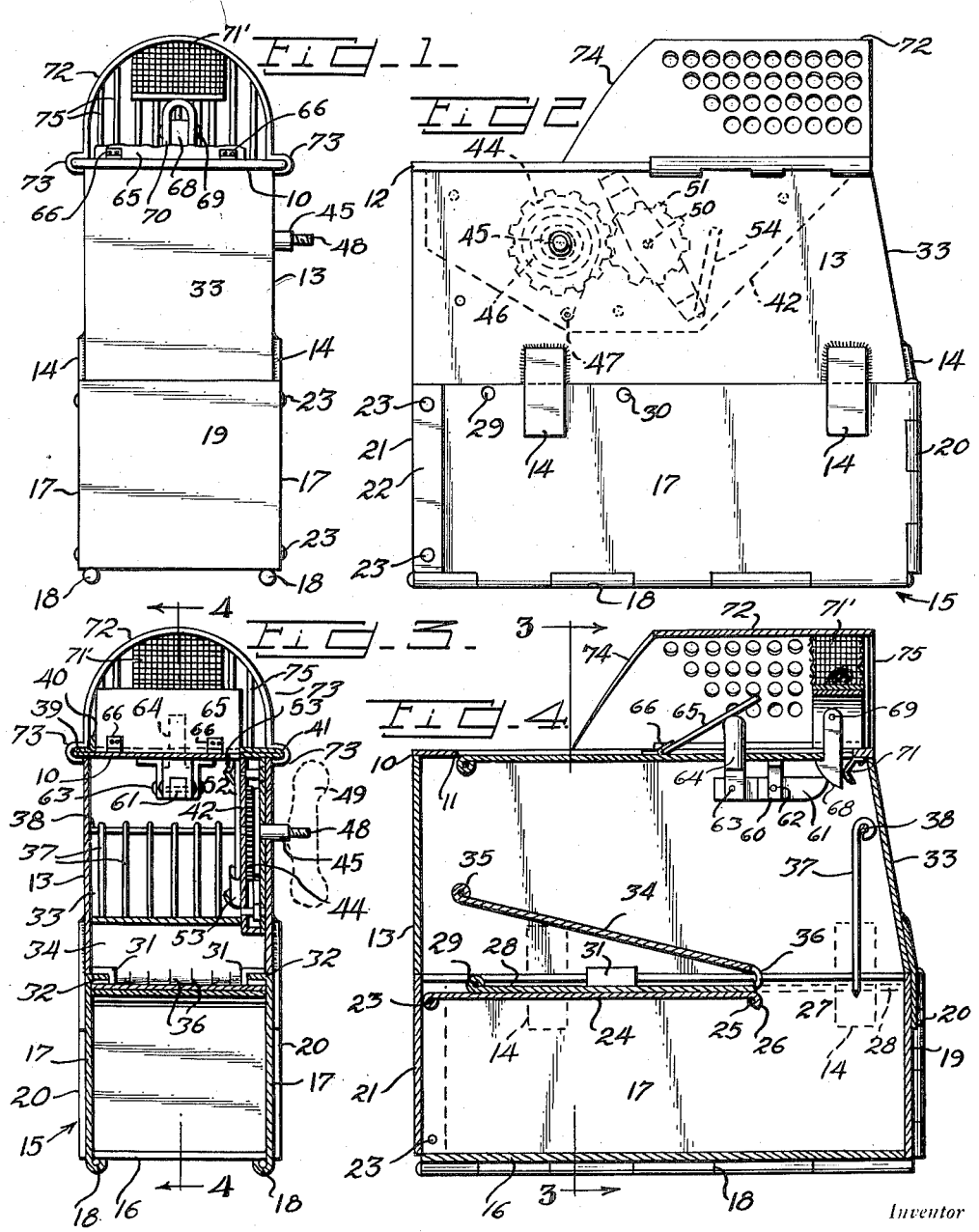
Inventor
Edward Torgeson
By Clarence A. O'Brien
and Harvey B. Jacobson
Attorneys Dec. 18, 1951     E. TORGESON     2,578,762
ANIMAL TRAP
Filed Oct. 17, 1946     3 Sheets-Sheet 2
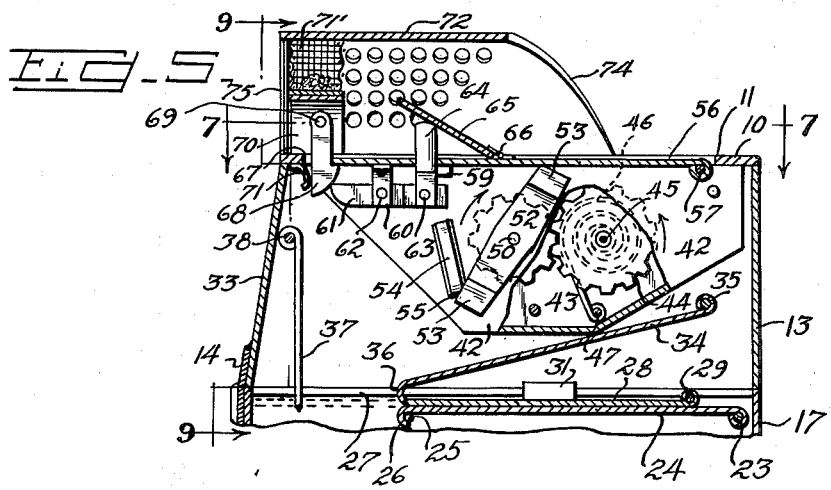
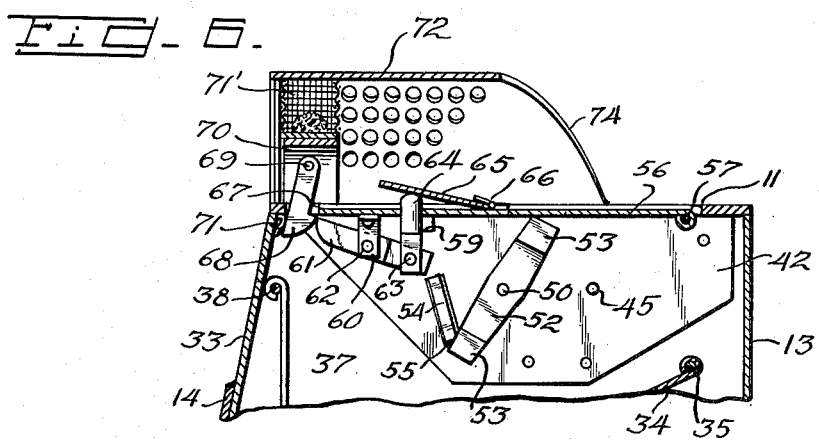
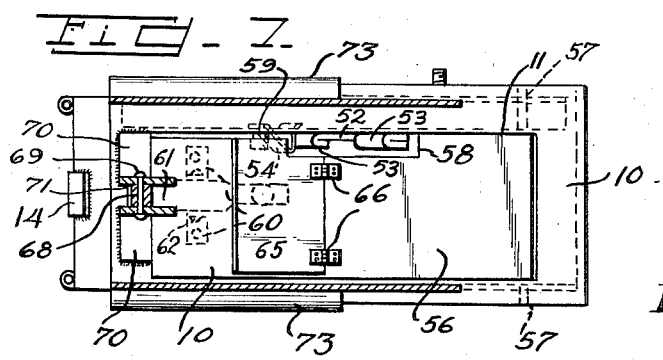
Inventor
Edward Torgeson
By Clarence A. O'Brien
and Harvey B. Jacobson
Attorneys Dec. 18, 1951  E. TORGESON  2,578,762
ANIMAL TRAP
Filed Oct. 17, 1946  3 Sheets-Sheet 3
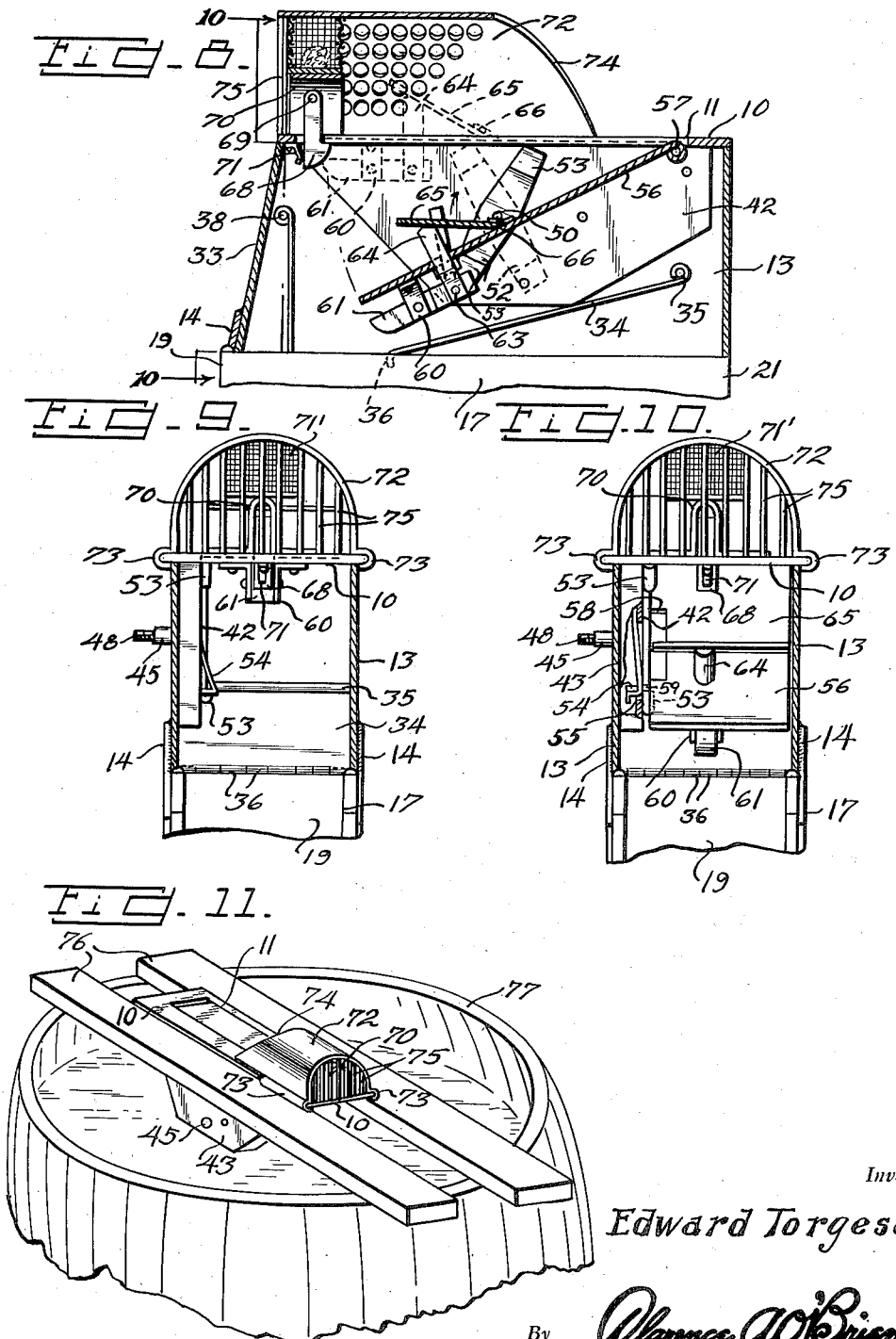
Inventor
Edward Torgeson
By Clarence A. O'Brien
and Harvey B. Jacobson
Attorneys Patented Dec. 18, 1951

2,578,762

UNITED STATES PATENT OFFICE 2,578,762

ANIMAL TRAP

Edward Torgeson, Grygla, Minn.

Application October 17, 1946, Serial No. 703,923

9 Claims. (Cl. 43—73)

This invention relates to traps for catching various animals, such as rodents, including rats or mice, mink, martins, fishers and other animals or birds which walk or crawl, without injuring the same, and adapted to be made in various sizes, according to the size of the game or animals to be caught.

An object of the invention is to provide a trap including a trap door that is actuated to an open position as an animal attempts to obtain the bait mounted in the trap thereby releasing the animal from the trap door whereby the animal will drop into a cage, receptacle or water container to be drowned.

An object of the invention is to provide a novel three section animal trap in which the main trap portion may be placed between two boards on top of a barrel or tall tin can or other container for water, independent of the other remaining portions of the trap.

Another object of the invention is to provide a novel arrangement and construction of a trap door, means for holding the trap door closed, means for releasing the trap door and means for raising the same after the animal has been discharged or dropped into the cage or receptacle in which it is held from escape after trapping.

Another object of the invention is to provide a trap box that is extremely small and compact in structure to permit the same to be handled in a convenient manner.

Another object of the invention is to provide means for raising the trap door to set the trap each time the trap is operated to catch an animal, thereby automatically resetting the trap without requiring manual intervention for setting thereof, so that the trap is always in position for use in trapping animals.

Other objects and advantages reside in the details of construction and operation as more fully hereinafter described and claimed, reference being had to the accompanying drawings forming part hereof, wherein like numerals refer to like parts throughout, and in which:

Figure 1 is an end elevation of a trap constructed in accordance with the invention;

Figure 2 is a side elevation thereof;

Figure 3 is a vertical sectional view taken on the line 3—3 of Figure 4;

Figure 4 is a central longitudinal sectional view taken on the line 4—4 of Figure 3 and showing the trap door set for trapping an animal;

Figure 5 is a longitudinal sectional view showing the means for resetting or closing the trap door;

Figure 6 is a view similar to Figure 5 showing the catch for holding the trap door closed or elevated, in a released position;

Figure 7 is a horizontal sectional view taken on the line 7—7 of Figure 5;

Figure 8 is a view similar to Figures 5 and 6 with the trap door dropped to discharge the game or animal;

Figure 9 is a sectional view taken on the line 9—9 of Figure 5;

Figure 10 is a sectional view taken on the line 10—10 of Figure 8; and

Figure 11 is a perspective view showing a trap supported between two boards on top of a barrel or receptacle such as a can for containing water.

Referring now to the drawings in detail, wherein for the purpose of illustration, there is disclosed a preferred embodiment of the present invention, the numeral 10 represents a substantially rectangular base plate having a central, preferably rectangular opening 11. The longitudinal side edges of the base plate 10 are folded inwardly upon themselves to provide reinforced side portions that are slidably received in grooved flanges or channels 12 on the top of an intermediate receptacle 13.

The receptacle 13 is open at its top and bottom and secured to the sides of the receptacle 13, is a plurality of spring prongs or resilient strips 14 having free ends that yieldingly bear against opposite sides of the cage or receptacle 15 to retain the receptacle 13 and cage 15 in a relative position.

The receptacle 15 is provided with a bottom wall 16 that is hinged, as at 18, to the side wall 17 of the receptacle 15, and the ends of the side 17 are hinged as at 20, to the end wall 19 of the receptacle 15, so that the receptacle may be conveniently collapsed to form a substantially flat article for carrying.

Vertical side flanges 22 extend from the end wall 21 of the receptacle 15 and bear against the side wall 17. These flanges 22 are provided with a plurality of openings that register with suitable openings provided in the side wall 17, and holding pins 23 extend through the openings in the flanges 22 and the side wall 17 to retain the receptacle 15 assembled. In order to collapse the receptacle, the pins 23 are removed from their normal position through the side wall 17 and side flanges 22 and the hinge pins of the hinges 20 are removed.

The numeral 24 represents a cover or upper wall for the receptacle 15 having a sleeve or casing at one end that pivotally receives the uppermost of the holding pins 23, see Figure 4. The free end of the cover 24 is flared downwardly to provide a curled end 26 that embraces a pin 25 extending between the side walls of the receptacle 15 to support the cover in a substantially horizontal position with the curled end 26 spaced from the end wall 19 to provide an opening 27. A slidable cover section 28 is provided over the cover 24, and is anchored at one end on a pin 29 that extends between holes in the side wall 17. By removing the pin 29, the cover section 28 may be moved to cover the opening 27 as indicated in Figure 4 of the drawings and by inserting the pin 29 in the holes 30 in the side walls 17 the cover section will be retained in a locked position for closing the opening 27. The cover section 28 may also be provided with arcuately opening U-shaped or grooved guides 31, to engage side flanges or guide ways 32 on the upper edges of the side walls 17 which also prevent the cover section 28 from being opened upwardly by the animals.

The intermediate section 13 may have a sloping end 33, and is provided with a plurality of tongues or strips 14 at the sides and one end thereof, to engage over the sides 17 and end 19, in order to retain the open ended section 13 in position on the cage or receptacle 15. In addition, an inclined plate 34 is hinged transversely as at 35 near one end of the receptacle 13, forming the intermediate section, and at its lower free end, is provided with a plurality of spaced wires or bars 36 sloping downwardly, so that the sliding door section 28 may be closed. That is, the hinged door or plate 34 will raise when the door section 28 is closed. A plurality of bars 37 are hinged on a pin 38 near the end 33 to hang down in the opening 27 and adapted to swing against the end 33 when the door section 28 is closed or slid to cover the opening 27. These wires will drop or hang down in vertical position away from the end wall 33 when the sliding cover section 28 is open, so as to prevent the animals from getting up through the opening 27 when the trap is in use.

One inturned longitudinal edge of the base plate 10 is indicated at 39 and may be flanged upwardly at its inner edge as indicated at 40, to stiffen the side of the base plate, which is in the form of an open frame. The other side is rebent as indicated at 41 to form an outwardly extending flange from which there depends a wall 42 forming the side or inner wall of a vertical gear housing. The gear housing is provided with an outer wall 43 enclosing a rotatably supported gear or pinion 44, on the shaft 45 of which, one end of a coil spring 46 is secured, the opposite end of the spring being anchored to the casing or housing 43 as indicated at 47. The shaft 45 is provided with a threaded end 48 receiving the socketed portion of a key 49 for winding the spring. A shaft 50 is also rotatable in the casing 43 and carries a pinion or gear 51 that meshes with the pinion or gear 44 so that the latter is turned from the former. On the shaft 50 at the inner side of the wall 42, a cross arm 52 is fixed having its ends provided with laterally off-set hooks or tongues 53 forming grooves between the same and the cross arm, facing in the opposite direction. A normally inwardly pressed spring catch 54 is designed to engage the ends of the cross arm 52 as shown in Figure 6 of the drawings, to prevent turning of the cross arm in one direction, but is designed to be pressed outwardly through an opening 55 in the wall 42, to permit the cross arm to turn. The cross arm is disposed beneath a trap door 56 pivoted or hinged at 57 at one end of the opening 11 and having a recess 58 at one side to accommodate the ends of the cross arm 52 therethrough as the trap door is moved to an open position. The trap door 56 is provided with a depending lug 59 at one side, so that when the trap door swings down from a position normally closing the opening 11 to the position shown in Figure 8, it will depress the spring catch 54 to cause the lower outwardly bent end thereof to move outwardly through the opening 55 and release the cross arm 52 so that the latter can turn and engage the trap door to move it to a closed position after the trap is operated each time.

In order to normally hold the trap door closed and release it upon the animal attempting to obtain the bait to be later described, the trap door 56 is provided with a depending bracket or pivot ears 60 fixed to the bottom thereof adjacent its free end, in which a latch or trigger 61 is pivoted as at 62, said trigger having an end being rounded on the underside as shown best in Figures 5 and 6. The inner end of the latch or trigger 61 is pivoted as at 63 to the lower bifurcated end of a plunger 64 which extends up through an opening in the trap door 56 so that the upper end is designed to be covered over and engaged by a trigger plate or treadle 65 hinged as at 66 on top of the trap door 56. The free end of the trap door 56 is also provided with a recess 67 that receives a spring urged catch 68 pivoted at 69 in an inverted U-shaped bearing bracket and housing 70 secured on top of the base plate 10 and above the trap door 56. A spring arm 71 attached to the base plate 10 resiliently urges the nose end of the catch 68 to engage under the trap door and hold it closed. The nose end of the catch 68 is also curved, to engage the adjacent end of the trigger 61 so that as the trigger 61 is rocked, by the plunger, the catch 68 will be urged away from the trap door to release the door whereby the same will move to an open position. The bait is enclosed within a wire or foraminous closure or bait box 71' supported over the bearing housing 70 within a perforated hood 72 having a semi-circular cross section and provided with opposite flanges 73 engaged over the opposite longitudinal edges of the base plate 10. One end of the perforated hood 72 is preferably inclined or tapered as indicated at 74, while the opposite end of the hood is closed by bars 75 to prevent access to the bait from said end, but to avoid scaring the animal, inasmuch as the hood is open from end to end, and the animal may see through the same.

In the operation of the device, when the animal walks upon the trap door 56 and presses upon the treadle 65 in an attempt to obtain the bait, the plunger 64 is forced downwardly to release the catch 68 and the animal is thereby precipitated into a cage or the receptacle 17 by downward swing of the trap door from the position shown in Figures 5 and 6 to the position shown in Figure 8. The cross arm 52 is held by the catch 54 from turning until the lug 59 depresses the catch 54 and releases the cross arm so that the latter will swing upwardly beneath the trap door 56 to close the same after the animal falls whereupon the cross arm continues to rotate until one end thereof engages the catch 54 as illustrated in Figure 5 of the drawings, thus retaining the cross arm in a normal position. The lug 59 is designed to pass into the rebent or hook ends 53 of the cross arm 52 in releasing the catch 54 so as to move upwardly with the arm as the latter is turned to close the trap door and again cause engagement of the catch 68 with the free end thereof. The nose end of the trigger 61 engaging the nose end of the catch 68, will raise the plunger 64 and the treadle 65 to again place the latter in a normally inclined position for releasing the catch of the trap door. In this manner, the trap door is closed and the trap reset after each catch to avoid the necessity for setting the same by hand. If desired, the base plate 10 and the trapping mechanism may be mounted between two boards 76 placed across the top of a barrel or can 77 containing water, so that the animal is precipitated into the water and drowned. Obviously, the receptacle 17 may be substituted by a crate or wire cage and staked in rivers or sloughs for the purpose of catching muskrats, which will be drowned upon being precipitated into the wire crate or cage.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In a trap of the class described, a base plate having an opening therein, a trap door hinged at one end of the opening to close the same, a catch at the other end of the opening adapted to engage the trap door to hold the same in closed position, a treadle upon the trap door, a plunger having a catch operated by the treadle upon depressing the same to release the first named catch to permit the trap door to drop, a housing over the catch on the base plate and having a bait cage therein, said housing being disposed over the treadle to insure depression of the latter upon attempt to obtain the bait, a casing depending from the base plate at one side of the opening, spring actuated gears mounted in the casing, a cross arm associated with the shaft of one of the gears, a spring catch normally projecting inwardly from the side of the casing to engage the arms of the cross arm to prevent rotation of the latter until the trap door drops, said trap door depressing the spring catch to permit rotation of the arm for raising the trap door to a closed position engaged by the first named catch.

2. In a trap of the class described, a base plate having an opening, a trap door hinged at one end of the opening, a spring catch at one end of the base plate to engage the free end of the trap door to hold the same in a closed position, a hood over said catch, a bait holder over said catch beneath the hood, a treadle hinged upon the trap door at its end remote from the catch, a lever pivoted beneath the free end of the base plate, a plunger pivotally connected to one end of the lever remote from the end of the base plate and extending up through the base plate beneath the treadle for depression upon depression of the treadle by the animal approaching the bait, a casing depending from one side of the base plate at the edge of the opening, spring actuated gears in said casing, a cross arm rotatable with one of the gears and mounted at the inner side of the casing, said cross arm having rebent ends forming grooves, a lug depending from the trap door, and a spring catch normally projecting inwardly from the side of the casing to prevent rotation of the cross arm and adapted upon dropping of the trap door to be depressed by the lug for permitting rotation of the arm for closing the trap door.

3. A trap comprising a base plate having an opening therein, a trap door hinged to said plate and normally closing the opening, a supporting bracket carried by said base plate, means pivotally mounted on said bracket normally retaining the trap door in a closed position, a plunger slidably carried by the trap door, means carried by said plunger engaging said first mentioned means to actuate the latter as the plunger is urged in one direction, means for moving the plunger, a casing, spring actuated gears mounted in the casing, a cross arm associated with one of said gears, means restricting rotation of said cross arm until the trap door is released from its normal position, and means carried by the trap door acting on said last mentioned means to permit rotation of said cross arm for raising the trap door to a closed position engaged by said first mentioned means.

4. The combination of claim 3 wherein said first mentioned means includes a pivotal catch having a cam surface and spring means yieldingly urging said catch into locking engagement with said trap door.

5. The combination of claim 3 wherein said means for actuating said first mentioned means includes a rockable lever pivoted to said trap door and having one end secured to said plunger.

6. The combination of claim 3 wherein said means restricting rotation of said cross arm includes a spring clip having a free end portion normally bearing against one end of said cross arm.

7. A trap comprising a base plate having an opening therein, a trap door hinged to said base plate for swinging movement through said opening, a pivotal catch normally retaining said trap door in a closed position, a rockable lever mounted on said trap door and having an end portion bearing against said catch, a plunger slidably mounted on said trap door and connected at one end to said lever, a pressure plate for operating said plunger to rock said lever and disengage said catch with said trap door whereby the latter will swing to an open position, a casing, spring actuated gears mounted in said casing, one of said gears having a supporting shaft, a cross member associated with the shaft of one of said gears, a spring clip having a free end normally bearing against said cross member to prevent rotation of the latter, said cross member adapted to return the trap door to a normally closed position, and a lug fixed on said trap door for depressing the free end of said spring clip to release said free end from said cross member.

8. The combination of claim 3 wherein said last mentioned means includes a lug and means carried by said cross arm for yieldingly engaging said lug.

9. A trap comprising a base plate having an opening therein, a trap door hinged to said plate and normally closing the opening, a supporting bracket carried by said base plate, means pivotally mounted on said bracket normally retaining the trap door in a closed position, a plunger slidably carried by the trap door, means carried by said plunger engaging said first mentioned means to actuate the latter as the plunger is urged in one direction, means carried by the trap door for moving the plunger, a rotatable cross arm underlying the trap door, spring means acting on said cross arm and constituting a means for rotating the cross arm, means restricting rotation of said cross arm until the trap door is released from its normal position, and means carried by the trap door acting on said last mentioned means to prevent rotation of said cross arm for raising the trap door to a closed position engaged by said first mentioned means.

EDWARD TORGESON.

REFERENCES CITED

The following references are of record in the file of this patent:

UNITED STATES PATENTS

| Number | Name | Date |
|---|---|---|
| 562,603 | Harden | June 23, 1896 |
| 765,869 | Wynne | July 26, 1904 |
| 1,387,129 | Croyle | Aug. 9, 1921 |
| 1,451,223 | Howard | Apr. 10, 1923 |